Dec. 13, 1966  F. L. WILSON  3,292,171
DISPLAY DEVICE DEPOSITING SUSPENDED PARTICLES BY SELECTIVE
MAGNETIZATION OF A VIEWABLE SURFACE
Filed Aug. 31, 1964                                    3 Sheets-Sheet 2
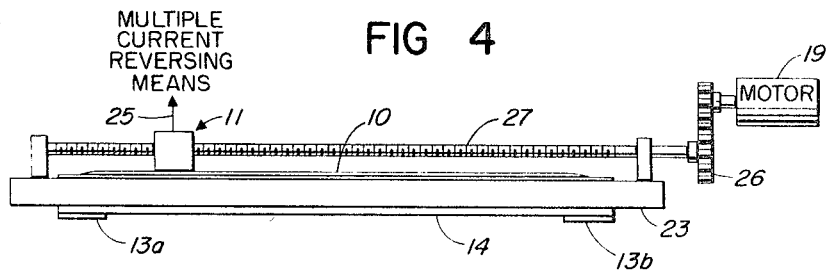
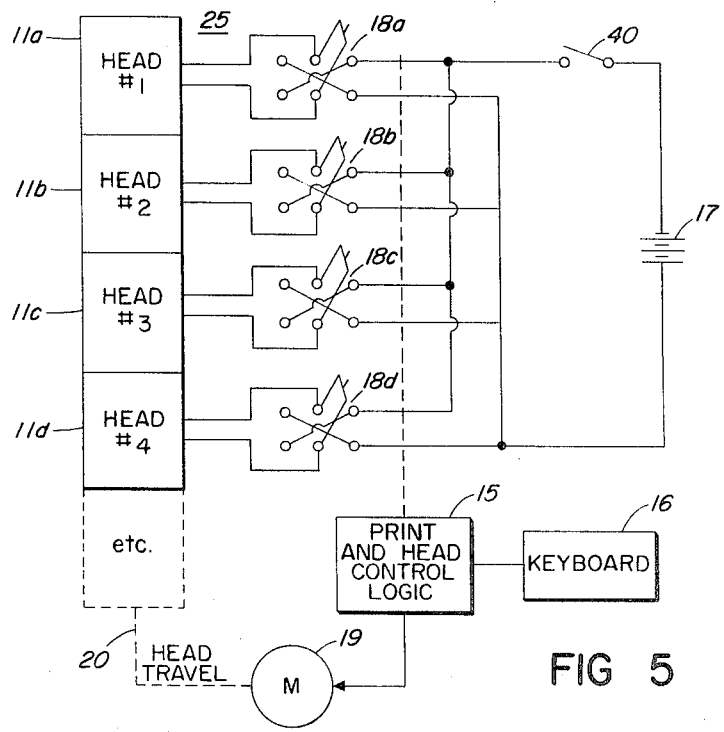
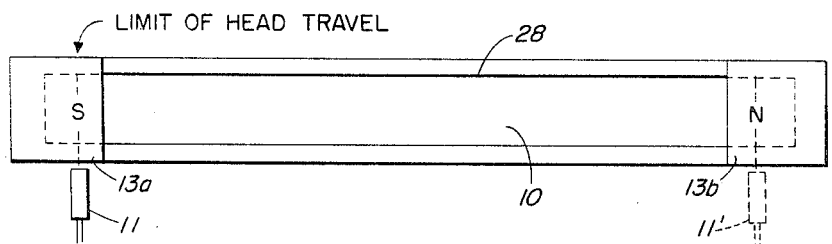
INVENTOR.
FRANKLIN L. WILSON
BY
*Moody & Anderson*
AGENTS

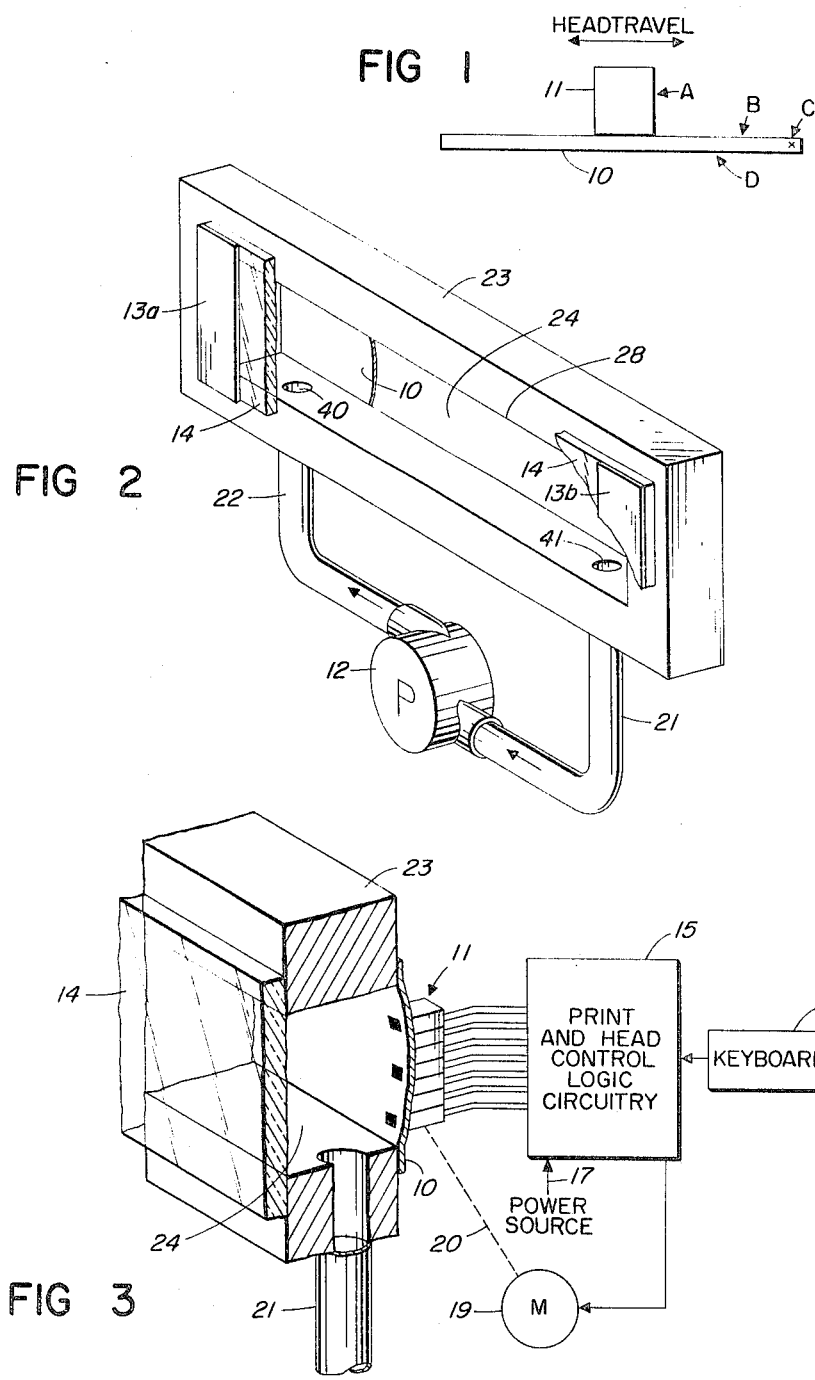

*INVENTOR.*
FRANKLIN L. WILSON
BY
*Moody & Anderson*
AGENTS ent invention;

United States Patent Office 3,292,171
Patented Dec. 13, 1966

3,292,171
DISPLAY DEVICE DEPOSITING SUSPENDED PARTICLES BY SELECTIVE MAGNETIZATION OF A VIEWABLE SURFACE
Franklin L. Wilson, Richardson, Tex., assignor to Collins Radio Company, Cedar Rapids, Iowa, a corporation of Iowa
Filed Aug. 31, 1964, Ser. No. 393,138
8 Claims. (Cl. 340—324)

This invention relates generally to alpha-numeric display apparatus and more particularly to an alpha-numeric display apparatus employing a technique of controlled visible deposit of ferrite material on a magnetic tape.

A type of ferrite display with which the present invention is related is that of reducing alpha-numeric characters to a particular pattern of rows and columns of visible "dots," thus utilizing a principle employed in the well-known score board apparatus wherein numerals are displayed by lighting discrete ones in a lamp bank arranged in a matrix of rows and columns. Such display techniques are additionally used in various advertising media and in numerous other applications wherein it is desired to display and/or read out information to the observer.

The present invention has an object thereof the provision of a visual display apparatus which functions on electromechanical principles employing magnetized tape in conjunctions with depositable ferrite material to form the viewed alpha-numeric characters.

A further object of the present invention is the provision of a magnetic display apparatus which provides a convenient and readily accessible memory for sequential readout and transmission purposes. The invention provides a device which rapidly displays alpha-numeric characters to the operator and inherently provides provision for simultaneously encoding the characters such that a sequential coded readout for transmission purposes is available.

A further object of the present invention is the provision of a display apparatus permitting random access to the display area for re-entry and erasure of alpha-numeric information defining characters.

A still further object of the present invention is the provision of an alpha-numeric display apparatus possessing a uniqueness among commercially available apparatus in size.

The invention is featured in the provision of a magnetizable steel tape a portion of which is viewable and with means for placing the tape in contact with a solution containing a suspension of ferrite particles. A magnetic recording head cooperates with the tape. The magnetization of the recording head is caused to be reversed during the head travel to cause a deposit of ferrite particles at that particular point on the tape surface, which deposit is viewable to the observer. By utilizing a multi-head arrangement, recording head deposits may be formed on a plurality of "tracks" extending longitudinally across the tape. The recording method permits erasure either while new material is being recorded or permits erasure at selected points within the display as desired.

These and other features and objects of the invention will become apparent upon reading the following description in conjunction with the accompanying drawings in which:

FIGURE 1 is a functional representation of the recording principles outlined in the present invention;

FIGURE 2 is a mechanical representation of a portion of the display apparatus as utilized in the present invention;

FIGURE 3 is a sectional view of the display apparatus including a cooperating recording head and functional control arrangements associated therewith;

FIGURE 4 is a top view of the record apparatus;

FIGURE 5 is a functional diagram of a means by which selective magnetization of a multi-element recording head may be controlled in accordance with the present invention;

FIGURE 6 is a diagrammatic representation illustrating recording characteristics in accordance with the invention;

Figure 7:
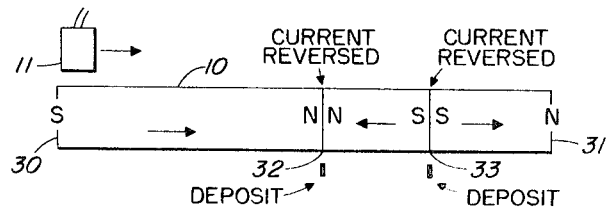
FIGURE 7 is a diagrammatic representation of the manner in which deposits are caused to be formed on the magnetic tape.

The basic principle of the present invention is illustrated diagrammatically in FIGURE 1 wherein a recording head A is movable with respect to a magnetic tape B. The tape B is in contact with a solution C containing ferrite particles in suspension. The ferrite particles are attracted to magnetized poles on the tape B so as to produce a deposit which may be observed through a clear view window D. This basic principle may be utilized then to form, by ferrite deposits, a "dot" pattern or patterns in the form of alpha-numeric characters.

In accordance with the invention, the ferrite particles are held in suspension in a solution which acts as a vehicle for the ferrite and the solution is caused to constantly flow past the tape surface upon which the ferrite particles are to be deposited. The recording principle is such that deposit build-up for any given magnetic pole on the tape B is inherently self-limiting, thus eliminating smudge and blur in the displayed characters.

The diagrammatic principle of FIGURE 1 is illustrated in FIGURE 2 wherein a plate member 23 has formed therethrough an opening 24. The front or observer's side of plate 23 has affixed thereon a clear viewing window such as a plastic or glass member 14 which overlaps the opening 24 in the plate 23 and forms a pressure seal with respect thereto. A magnetic tape member 10, preferably of steel, is placed across the back of the opening 24 and has a sealed relationship with respect thereto such that the viewing plate 14 and magnetic tape 10 form, in conjunction with the plate member 23, a sealed and enclosed chamber. The fluid carrying the ferrite particles in suspension is continuously circulated through the chamber 24 by means of ports 40 and 41 which are connected to fluid lines 22 and 21 respectively. Lines 22 and 21 communicate with a fluid pump 12. The chamber 24, together with the lines 21 and 22 and the pump 12 thus form a closed system, which, under the influence of the pump 12, causes a continuous flow of fluid containing ferrite in suspension through the chamber 24 and thus continuously past the inner surface of the magnetic tape 10.

As illustrated in the cut-away view of FIGURE 3, the magnetic tape 10, under the influence of the pressurized fluid vehicle within the chamber and pumping system, causes the magnetic tape to bow out slightly such that a good contact may be made between the outer surface of the magnetic tape 10 and the cooperating plurality of the magnetic recording element 11. FIGURE 3 further illustrates a motor 19 having a mechanical connection 20 with recording head 11 such that the head position with respect to the tape 10 may be altered. An interconnection between the motor 19 and a print and head control logic circuitry 15 permits selective positioning of the recording head 11 with respect to the longitudinal axis of the tape 10.

FIGURE 4 illustrates a top view of the recording arrangement showing the plate member 23, having affixed on the front face thereof, plate 14, and to the rear face thereof, the magnetic tape 10. The recording head 11 might then be readily caused to be positioned along the surface of tape 10 by being mounted on a threaded carriage member which cooperates with a lead screw 27, which is rotatable through appropriate gear drive 26 by a positioning motor 19.

The recording technique of the present invention is based on a visible deposit of ferrite material at selectively controlled points on the tape 10. The points at which the deposit is formed are actually magnetic poles which may be selectively formed or "recorded" on the magnetic tape. The principle is analogous to the attraction of iron filings to a bar magnet, for example, wherein the filings tend to concentrate at the respective north and south magnetic poles at the ends of the bar.

The present invention then embodies the formation of numerous magnetic poles along the axis of the tape in a manner analogous to arranging a plurality of bar magnets end on end. This principle is illustrated in FIGURE 6. Let it first be assumed that the recording head 11 is caused to traverse the tape from left to right while current is flowing in a reference direction through the head 11 so as to magnetize the tape in a referenced direction with a south pole on the left end and a north pole on the right end. For reasons to be further explained, the limit of tape travel illustrated by the positions 11 and 11' of the recording head is in excess of that portion of tape 11 which is visible to the viewer through the viewing window defined by the cutout 24 in the plate member 23 and the end mask members 13a and 13b (FIGURE 2). Now, with reference to FIGURE 7, let it be assumed that the recording head 11 is caused to travel from left to right and, as the head 11 reaches the point 32 on the tape 10, the direction of current flow through the head 11 is reversed. The current reversal at the point 32 forms an opposite pole at this point and succeeding portion of tape is reverse magnetized. The pole formed at the point 32 causes a deposit of suspended ferrite material to form on the surface of the tape 10 at this point. Assuming further travel of tape head 11, if the current is again reversed at the point 33 on the tape, the magnetization of the tape is again reversed and a still further magnetic pole is formed at which pole another deposit of ferrite material is formed. It is seen then that if we assume that the tape is first magnetized in a reference direction by causing the head 11 to be passed over the length of tape with current flowing therein in a reference direction, each subsequent current reversal in the control head 11 as the head then passes from left to right on the tape forms a magnetic pole at which ferrite will be deposited. It is this principle upon which the present invention operates to form alpha-numeric characters which may be viewed by the observer.

The letters of the alphabet and figures may then be formed by the use of, for example, seven rows and five columns of dots. In this instance, the magnetic recording head 11 would be comprised of seven elements as depicted in FIGURE 3, each cooperating with longitudinally extending "tracks" along the tape 10.

In a model which was caused to be constructed, characters were formed from a 35 dot square pattern, that is, a pattern seven dots high and five dots wide. The letter "T," as depicted in FIGURE 8, may be formed from a permutation of dot deposits for each of five space increments on track 1 of the tape with formation of dot configurations on tracks 2–7 only in the third column of the pattern.

Figure 8:
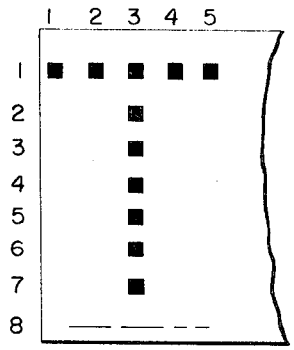
FIGURE 8 is a diagrammatic representation of the manner in which alpha-numeric characters may be formed.

FIGURE 8 illustrates each of the patterns as being comprised of single dots or deposits. Although not specifically illustrated, the invention contemplates the formation of dots which would be actually a series of dots formed by closely spaced poles such that the composite would be more visible to the observer. Thus, the current through the recording head might be reversed a plurality of times during a predetermined translation of the recording head for the formation of each dot in the pattern. It is preferable from the standpoint of versatility as concerns re-entry, erasure, etc., that the number of current reversals in the recording head for each dot be an even number to retain a consistent relationship between the magnetized intervals and the reference magnetization. Thus, each dot might be comprised of, for example, two or four deposits formed by current reversals in closely spaced proximity.

FIGURE 3 illustrates each of the recording elements in the recording head 11 as being connected to a print and head control logic circuitry 15. For the purpose of illustrating the principle of the invention, this circuitry might be comprised as illustrated in FIGURE 5, wherein the connector pairs 25 associated with the recording head elements 11a, 11b, 11c, 11d, etc., are connected individually to a simple double throw, double pole reverse switch 18a–18d each of which is connected to a polarized power source such as the battery 17. This expedient was used in a hand-operated model wherein the logic circuitry actually then became a plurality of toggle switches which, for any given position of the recording head 11, with respect to the tape, could be placed in appropriate positions, such that when a record switch 40 was closed, the current flow through the head elements 11a–11d could be selectively either reversed or not reversed from a reference character so as to control the formation of magnetic poles on the tape in a selected pattern. It is contemplated, however, that the present state of the art would provide numerous elecronic arrangements in conjunction with a keyboard 16 by which the head travel and selective dot formations would be rapidly formulated through logic circuitry such that the device would display the characters much the same as a mechanically operated typewriter device. The keyboard might then include the selected various alpha-numeric characters. The depression of a key would cause a sequence to take place of tape head advance through five longitudinal increments and formulation of appropriate permutations of current flow within the various recording head elements to effect the dot formation making up the selected character.

As previously discussed, the dots which form the alphanumeric display are formed as deposits of ferrite material. The ferrite material is held suspended within the fluid vehicle which is constantly flowing across the surface of the recording tape 10. This technique inherently provides a degree of versatility concerning erasure and access. Since the principle defines the formation of a deposit for each current reversal in the recording head, the device inherently enables an automatic reprint and simultaneous erasure in the dot pattern. It further enables the operator to position the tape head anywhere within the display at the beginning of a given character defining column. In general, for random access, the tape may be premagnetized with a reference magnetization by driving the recording head across the tape in a predetermined direction with a reference current flow through the head or the head elements as the case may be. The principle of the invention, however, permits an operational mode which does not permit random access but does not require that the tape be premagnetized in any reference direction. Such an operation requires that the recording and display sequence be sequentially effected from a given end of the tape and does not permit random entry.

Figure 9A:
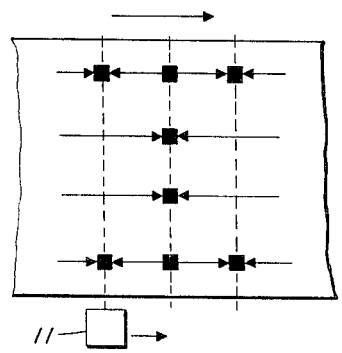
FIGURES 9a and 9b represent writing, re-entry, and erasure characteristics according to the principles of the invention.
Figure 9B:
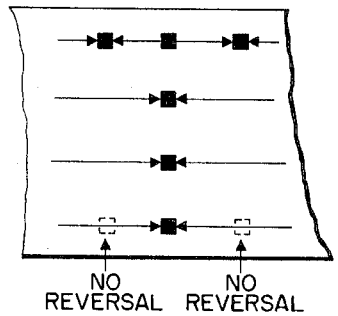

The principle of the self-erasing feature is illustrated in FIGURES 9a and 9b. FIGURE 9a illustrates the letter "I" as it might be formulated by a particular dot configuration. In this example, the assumption is made that the character-defining dots are formed in three columns and four rows. If the tape is assumed to be premagnetized in a reference direction as indicated by the arrow over the dot configuration, as the control head 11 leaves the first column location, a current reversal in the recording elements associated with the top and bottom rows is effected to form deposits. As the recording head 11 moves to the next column position a current reversal would be effected in each of the recording head elements to cause a deposit in each of the rows. The third and final tape head position would effect a current reversal in the top and bottom recording head elements to form deposits in the top and bottom rows such that the observer views the dot pattern in the form of the letter I. Now, with reference to FIGURE 9b, should the tape head 11 be backed up to the first row and it be desired to print the letter T rather than the letter I, the current flow logic associated with the recording head elements would cause a reversal in the head associated with the top row in the first column position but would not cause a reversal for the bottom row at this position and thus no deposit would be formed. The bottom dot is effectively "erased." For the second row position of the recording head element, a current reversal would be effected for each of the rows. For the third column position of the recording head element a phase reversal would be effected only for the top row. Since the logic for the formation of the letter T would command no current reversal in the recording element for the bottom row, the deposit previously effected at this position for the letter I would be washed away by the action of the fluid passing over the dot location due to the magnetic "erasure" of the pole at this point.

It is important to emphasize that the deposits of ferrite material are formed on the tape at those points where a magnetic pole is located and that the magnetic poles are selectively formed at those points on the tape at which the current in the recording head elements is reversed. For this reason, with reference to FIGURE 6, a deposit would permanently be formed at the extremes 11 and 11' of the recording head travel. The mask members 13a and 13b would thus allow the observer to view a lesser length of tape such that the deposits occurring at the extremes of the head travel would not be visible. The reason for the formulation and retention of the dot configurations at those tape positions defining the extremes of the recording head travel stems from the fact that, since the head does not travel past these points, there can be no erasure effected, i.e., there is always a magnetic pole at the extremes of the recording head travel.

In operation then, the recording head 11 is first caused to traverse the length of the tape 10 while current flows through the head in a reference direction so as to premagnetize the tape in a reference direction. During the writing sequence, the head is moved from left to right with the current in a particular element of the recording head 11 being reversed to form a ferrite deposit. The number of reversals may be in excess of one and preferably an even number of reversals for each "dot" configuration so as to permit random access in the printing procedure. When a particular space in the dot configuration or matrix defining character is to be left blank, the current through the recording head elements for that particular segment is permitted to remain in the same direction as that through the head during the initial reference magnetization of the tape.

The formulation of an alpha-numeric display in accordance with the principles of the invention provides a ready means for reading out the displayed information. For example, an operator might selectively "write" a given message on the tape 10. Means could subsequently be provided to cause the head to travel the length of the tape and in conjunction with appropriate readout logic, to cause the permutations of the dots to be read out and stored, recorded, transmitted, etc. It is further contemplated that an additional recording head element (element 8, FIGURE 8) might be incorporated in the recording head 11 to record the alpha-numeric character in standard telegraphic code simultaneously with the formation of the dot deposits being formed in alpha-numeric configuration. The readout would then be in the form of a series of telegraphic code impulses which could be utilized to store or transmit the displayed information in accordance with a desired application.

Although not specifically limited thereto, the present invention is believed to find operational utility in display devices utilized by airlines for reservation requests wherein, for example, the operator could record a reservation request by use of a keyboard and appropriate logic circuitry, and then actuate a readout mechanism for transmitting this information in digital or other coded form to a central information center. The present invention provides an electronic means permitting a wide range of readout possibilities for this purpose, and permits the elimination of complex mechanical display techniques currently utilized in the art.

Although the present invention has been described with reference to a particular embodiment thereof, it is not to be so limited as changes may be made therein which fall within the scope of the invention as described in the appended claims.

I claim:

1. A magnetic display means comprising a fluid-tight chamber, a strip of magnetic steel tape forming at least a portion of one wall of said chamber, a clear transparent strip member forming at least a portion of an opposite wall of said chamber, said chamber carrying a fluid vehicle into which is suspended a quantity of ferrite particles, magnetic recording head means communicating with the outer surface of said magnetic tape, drive means for translating said recording head means along the length of said tape in a selective manner, current and drive control means including a current source connected to said recording head, and said drive and current control means including means for initially driving said recording head the length of said tape in a predetermined direction with current flow continuously effected in a reference direction and subsequently driving said recording head to selected positions with said current flow being caused to be reversed for certain ones of said selected positions, each said selected position with reversal of current flow in said head effecting a deposit of said ferrite particles at that point on said tape juxtapositioned with said head, each said selected position without reversal of current flow freeing any previously deposited ferrite particles from the point on said tape juxtapositioned with said head.

2. Display apparatus as defined in claim 1 further comprising means for causing said fluid vehicle to be continuously in motion with respect to said magnetic tape.

3. Display apparatus as defined in claim 2 wherein said chamber is fitted with first and second fluid ports, a fluid pump connected serially with said ports, said fluid pump effecting a continuous flow of said vehicle in a predetermined direction with respect to the inner surface of magnetic tape.

4. Display apparatus as defined in claim 3 wherein said fluid pump and said chamber comprise a closed system with a predetermined fluid pressure maintained therein, said magnetic tape exhibiting a flexibility wherein under influence of said fluid pressure said tape is bowed outwardly with respect to said chamber into contact with said recording head means.

5. Display apparatus as defined in claim 4 wherein said recording head means is comprised of a plurality of magnetic recording elements arranged transversely of the longitudinal axis of said recording tape, said current and drive control means comprising means for effecting permutations of predetermined directions of current flow in said magnetic recording elements for selected positions of said recording heads means.

6. Display apparatus as defined in claim 5 wherein said apparatus is utilized to display alpha-numeric characters, each said character being defined as a predetermined configuration of dot-like images in a matrix having $m$ rows and $n$ columns, said recording head being comprised of $m$ elements arranged transverse with respect to said tape, said recording head being positionable sequentially in a predetermined direction from a predetermined position with respect to said magnetic tape by $n$ position increments for each character formation sequence, said current and drive control means being adapted to effect changes of current flow direction in predetermined ones of said recording head elements for each incremental position of said recording head, said alphanumeric characters being formed of deposits of said ferrite particles at those points on said tape at which a reversal of said current is effected in the juxtapositioned one of said recording head elements.

7. Display apparatus as defined in claim 6 wherein said drive and current control means effecting a plurality of current reversals for each succeeding one of several closely disposed recording head positions to form each said dot-like image, each of said dot-like images is formed of a plurality of closely adjacent deposits of said ferrite material.

8. Display apparatus as defined in claim 7 wherein said plurality of current reversals affected for each dot-like image comprises $2x$ such reversals, where $x$ is an integer.

References Cited by the Examiner

UNITED STATES PATENTS

| 2,696,420 | 12/1954 | Roth | 346—74 |
| 2,820,956 | 1/1958 | Rueger | 346—74 |
| 2,841,461 | 7/1958 | Gleason | 346—74 |
| 2,932,278 | 4/1960 | Sims | 346—74 |
| 3,013,206 | 12/1961 | Youngquist et al. | 324—38 |
| 3,181,059 | 4/1965 | Mohnkern | 179—100.2 |
| 3,229,281 | 1/1966 | Hackenfort | 340—373 |

FOREIGN PATENTS

| 1,185,379 | 7/1959 | France. |

NEIL C. READ, *Primary Examiner.*

A. J. KASPER, *Assistant Examiner.*